United States Patent
Borra et al.

(10) Patent No.: US 9,501,307 B2
(45) Date of Patent: Nov. 22, 2016

(54) SYSTEMS AND METHODS FOR PROVIDING AVAILABILITY TO RESOURCES

(71) Applicant: COMCAST CABLE COMMUNICATIONS, LLC, Philadelphia, PA (US)

(72) Inventors: Sudhir Borra, Plainsboro, NJ (US); Douglas Makofka, Jim Thorpe, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 16 days.

(21) Appl. No.: 14/498,057

(22) Filed: Sep. 26, 2014

(65) Prior Publication Data

US 2016/0092254 A1   Mar. 31, 2016

(51) Int. Cl.
- *G06F 9/44* (2006.01)
- *G06F 9/455* (2006.01)
- *G06Q 20/08* (2012.01)
- *G06F 9/54* (2006.01)
- *G06F 9/445* (2006.01)

(52) U.S. Cl.
CPC .............. *G06F 9/45558* (2013.01); *G06F 9/54* (2013.01); *G06Q 20/085* (2013.01); *G06F 8/71* (2013.01); *G06F 9/44505* (2013.01); *G06F 2009/45595* (2013.01)

(58) Field of Classification Search
CPC ........ G06F 8/20; G06F 8/71; G06F 9/44505; G06F 11/3466; G06F 11/3409; G06F 11/3419
See application file for complete search history.

(56) References Cited

U.S. PATENT DOCUMENTS

| 8,570,989 B1 | 10/2013 | Mahler et al. |
| 9,270,766 B2* | 2/2016 | Rovniaguin ............ H04L 67/22 |
| 9,313,281 B1* | 4/2016 | Lietz ...................... H04L 67/16 |
| 2002/0165822 A1* | 11/2002 | Makipaa ........................ 705/40 |

(Continued)

FOREIGN PATENT DOCUMENTS

| EP | 1714474 A1 | 10/2006 |
| EP | 2166505 A2 | 3/2010 |

OTHER PUBLICATIONS

Chen et al., "Design and implementation of server cluster dynamic load balancing in virtualization environment based on OpenFlow", Jun. 2014, ACM, pp. 1-6; <http://dl.acm.org/citation.cfm?id=2619288>.*

(Continued)

*Primary Examiner* — Thuy Dao
*Assistant Examiner* — Ben C Wang
(74) *Attorney, Agent, or Firm* — Ballard Spahr LLP

(57) ABSTRACT

Methods and systems for providing a communication path are disclosed. Information can be received via a first communication session based on a first messaging protocol. The first communication session can be terminated at a virtual machine of a group of virtual machines. A dynamically bound communication path to a resource can be selected based on a dynamically reconfigurable routing table for the group of virtual machines. A second communication session can be initiated, at the virtual machine, via the selected dynamically bound communication path. The information can be transmitted to the resource via the second communication session based on a second messaging protocol.

19 Claims, 11 Drawing Sheets

(56) References Cited

U.S. PATENT DOCUMENTS

| | | | |
|---|---|---|---|
| 2002/0194335 A1* | 12/2002 | Maynard | G06F 9/505 709/225 |
| 2007/0271375 A1* | 11/2007 | Hwang | G06F 11/3419 709/224 |
| 2008/0126614 A1* | 5/2008 | Ooi et al. | 710/38 |
| 2010/0161773 A1* | 6/2010 | Prahlad | G06F 9/44505 717/174 |
| 2010/0180107 A1* | 7/2010 | Chaganti | G06F 9/5077 713/1 |
| 2010/0325474 A1* | 12/2010 | Gopinath | G06F 11/2038 714/4.1 |
| 2011/0055139 A1* | 3/2011 | Morimura | G06F 11/3419 706/47 |
| 2011/0099267 A1* | 4/2011 | Suri | G06F 9/4856 709/224 |
| 2011/0106520 A1* | 5/2011 | Emerson et al. | 703/25 |
| 2011/0154416 A1* | 6/2011 | Kim | 725/98 |
| 2011/0176555 A1* | 7/2011 | Poder et al. | 370/463 |
| 2011/0238792 A1* | 9/2011 | Phillips | G06F 15/177 709/220 |
| 2013/0044758 A1* | 2/2013 | Nguyen et al. | 370/401 |
| 2013/0346512 A1* | 12/2013 | Thiel | G06F 11/3409 709/206 |
| 2014/0067914 A1* | 3/2014 | Nishii | H04L 67/1008 709/203 |
| 2014/0146705 A1* | 5/2014 | Luxenberg et al. | 370/254 |
| 2014/0188996 A1* | 7/2014 | Lie et al. | 709/204 |
| 2014/0280998 A1* | 9/2014 | Richards et al. | 709/230 |
| 2015/0067135 A1* | 3/2015 | Wang | G06Q 10/06 709/223 |
| 2015/0281048 A1* | 10/2015 | Agarwal et al. | 709/230 |

OTHER PUBLICATIONS

Elsässer et al., "Load balancing in dynamic networks", May 2004, IEEE, pp. 1-8; <http://ieeexplore.ieee.org/stamp/stamp.jsp?tp=&arnumber=1300480>.*

Baikerikar et al., "Consensus Based Dynamic Load Balancing for Network of Heterogeneous Workstations", Jan. 2011, Springer-Verlag Berlin Heidelberg, pp. 116-124; <http://link.springer.com/chapter/10.1007%2F978-3-642-18440-6_14#page-1>.*

Robuck, Mike, Suddenlink tunes up VOD with SeaChange, Motorola, CED, (2008), available at: http://www.cedmagazine.com/news/2008/10/suddenlink-tunes-up-vod-with-seachange-mo (7 pages).

Strategic Alliances with Prominent Technology Providers, VeriMatrix, accessed on Nov. 18, 2013, available at: http://www.verimatrix.com/partners/sms-billing-pre-paid-solutions. (2 pages).

VCAS Multi-network Platform and Architecture, VeriMatrix, accessed on Nov. 18, 2013, available at: http://www.verimatrix.com/solutions/vcas-platform-and-architecture. (3 pages).

* cited by examiner

SYSTEMS AND METHODS FOR PROVIDING AVAILABILITY TO RESOURCES

BACKGROUND

Content providers often allow third-party clients to use resources, such as a content provider allowing a third-party billing system to use video controllers or video servers. Generally, a third-party client's request for a resource is sent via a connection directly from the third-party's system to the resource. This requires that the third-party clients have the information necessary to establish a connection for each particular resource with which the third-party clients wish to establish a connection. These and other shortcomings of the prior art are addressed by the present disclosure.

SUMMARY

It is to be understood that both the following general description and the following detailed description are exemplary and explanatory only and are not restrictive. Provided are methods and systems whereby a request for a resource by a client can be dynamically served. The request can be in a messaging protocol that is well-known. The client can send the request for a resource to a network load balancer. The network load balancer can then select a virtual machine cluster to forward the request to, using factors such as, for example, the current network traffic, the resource requested, and the messaging protocol that the request is in. The network load balancer can forward the request to the selected virtual machine cluster. The virtual machine cluster can terminate the request in the messaging protocol and recreate the request in a second messaging protocol. In an aspect, the second messaging protocol can be a proprietary protocol. The recreated request can be forwarded to the resource. In response to receiving the recreated request, the resource can connect with the client.

Provided are systems and methods whereby a virtual machine cluster can receive information via a first communication session. The first communication session can be based on a first messaging protocol. After the information is received, the first communication session can be terminated at a virtual machine of a group of virtual machines. A dynamically bound communication path to a resource can be selected based on a dynamically reconfigurable routing table for the group of virtual machines. A second communication session can be initiated via the dynamically bound communication path. The information can be transmitted, at the virtual machine, to the resource via the second communication session. The second communication session can be based on a second messaging protocol.

Provided are methods and systems whereby a computing device located in network storage can receive information via a first communication session. The first communication session can be based on a first messaging protocol. A network condition can be determined and a plurality of virtual routing assets can be managed based on the network condition. Managing can comprise selecting the plurality of virtual routing assets and/or reconfiguring a binding associated with the plurality of virtual routing assets. The received information can be routed via the plurality of virtual routing assets based on the determined network condition. The first communication session can be terminated. The information can be transmitted to a resource based on a second messaging protocol.

Provided are systems and methods whereby information can be received via a first port of a load balancer via a first communication session. The first communication session can be based on a first messaging protocol. The first port can be associated with an identifier of a resource. A network condition can be determined, and a virtual device can be selected based on the determined network condition. A second port can be dynamically bound to the selected virtual resource, resulting in a dynamically bound communication path. The received information can be transmitted via the communication path to the selected virtual device. The received information can be transmitted via the first communication session. The first messaging protocol can subsequently be terminated and the information can be further transmitted to the resource via a second communication session. The second communication session can be based on a second messaging protocol.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
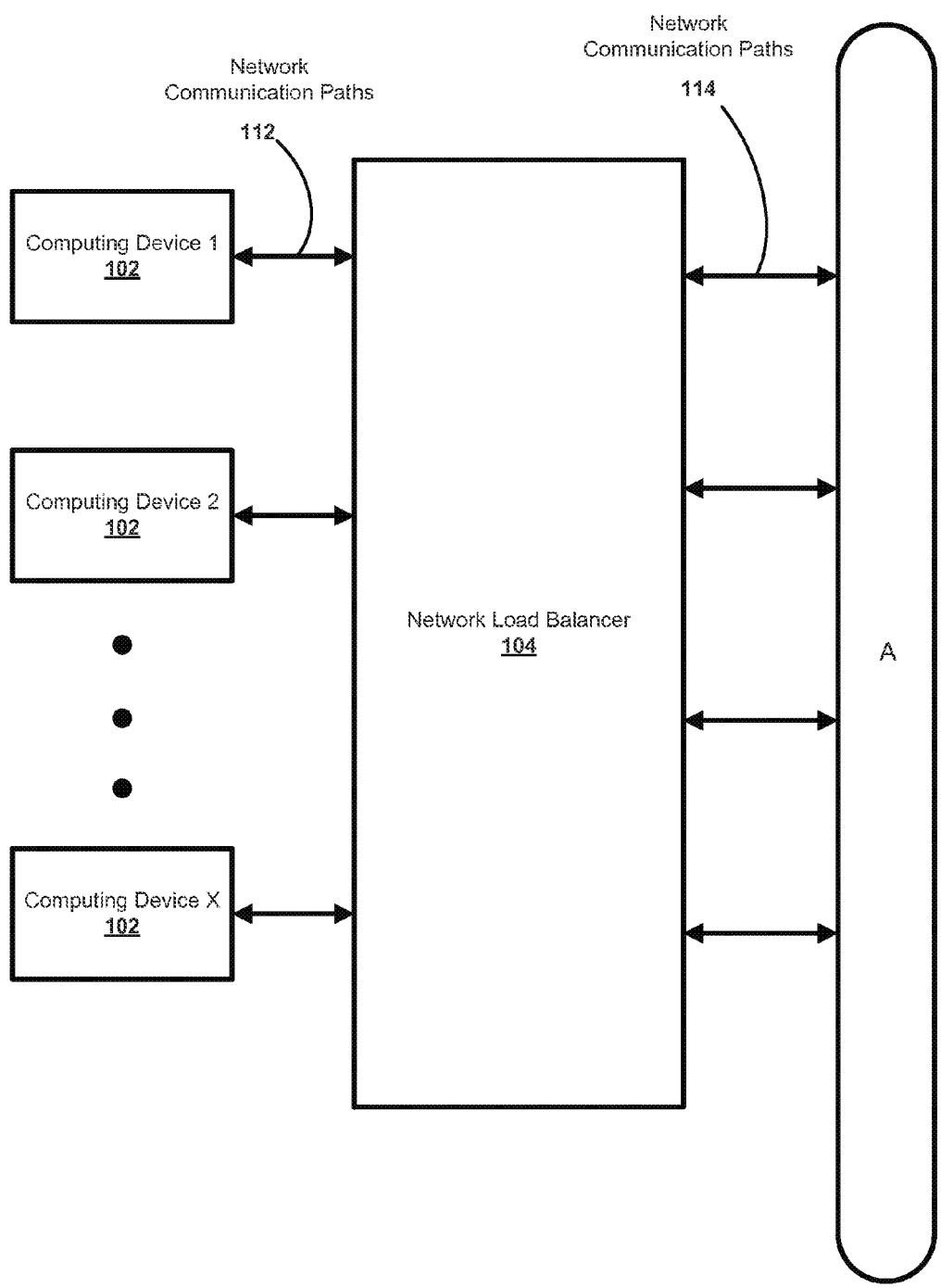
FIG. 1A illustrates an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value.

Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The systems and methods of this disclosure can allow a third-party client to dynamically access resources available on a network. For example, a third-party client can comprise a billing system and a resource can comprise a video controller. In an aspect, the third-party client can connect to the resource by transmitting a request directly with a network load balancer. The network load balancer can select a terminator proxy instance. In selecting a terminator proxy instance, the network load balancer can consider a variety of parameters, including, for example, network traffic, a messaging protocol used by the request, what messaging protocols the selected terminator proxy instance is capable of handling, and the particular resource requested. A communication session between the third-party client and the terminator proxy instance can use a first messaging protocol, such as business and operations support system (BOSS) or Wirelink. At the terminator proxy instance, the first communication session can be terminated. The terminator proxy instance can transmit the message to a resource, such as a video controller, using a second communication session. The second communication session can use a second messaging protocol. The second messaging protocol can be, for example, a messaging protocol that can be proprietary in nature and unknown (e.g., not specifically communicated during a communication session, not programmed to recognize) to the third-party. The first and second messaging protocols can be any known messaging protocol. The terminator proxy instance can also augment the message with additional information. Additional augmented information can include, for example, entitlement data.

The systems and methods provided can increase flexibility, by allowing a third-party to communicate with any resource through one address: a port on the network load balancer. A resource can comprise an element of a device, such as a user device, service provider device, content device, set top box, television, display, server, proxy, and/or the like. The resource can provide a service to the computing device on which the element is located and/or services to remote devices. The resource can comprise a controller (e.g., digital controller, video controller, audio controller, network controller), interface (e.g., video interface, audio interface, network interface), module comprising computer readable source code, display element, user interface, and/or the like. As a further example, the resource can comprise a digital network control system (DNCS), digital addressable controller (DAC), or other addressable controller. The systems and methods provided can also increase flexibility by allowing third-parties to communicate a message using one messaging protocol, and then convert the message according to a second messaging protocol recognized by the resource.

Additionally, a content provider can inspect and augment communications from a client to resources of the content provider. The systems and methods provided here allow a content provider to terminate a communication intended for a resource, translate the message contained in the communication to a format digestible for the resource, and augment the message with any details desired by the content provider.

A content provider can provide content and/or services to users (e.g., customers, subscribers) via a network. For example, the network can comprise one or more devices communicatively coupled via variety of communication paths, such as wireless and/or physical communication links. The one or more devices can comprise client devices, which are upstream from the devices used by customers to connect to the network. The network can further comprise resources available to the clients. For instance, one client can be a third-party billing system. The third-party billing system can access a resource, such as a video controller. Instead of relying on the one-to-one relationship of having a video controller dedicated to each billing system, the currently described systems and methods can allow a client to receive a resource in response to a request. The resource can be dynamically assigned to the client based on traffic. These systems and methods also allow for more flexibility because a new resource can be quickly redirected to the client in the event of a resource failure.

Additionally, a content provider can allow clients to use a variety of messaging protocols to interact with the resources deployed by the content provider. A content provider can inspect or augment communications from a client to resources deployed by the content provider. The systems and methods provided can allow a content provider to terminate the communication intended for a resource in one messaging protocol, translate the message contained in the communication to a format digestible for the resource, such as a second messaging protocol, and augment the message with any details desired by the content provider before transmitting the message to the resource.

Figure 1B:
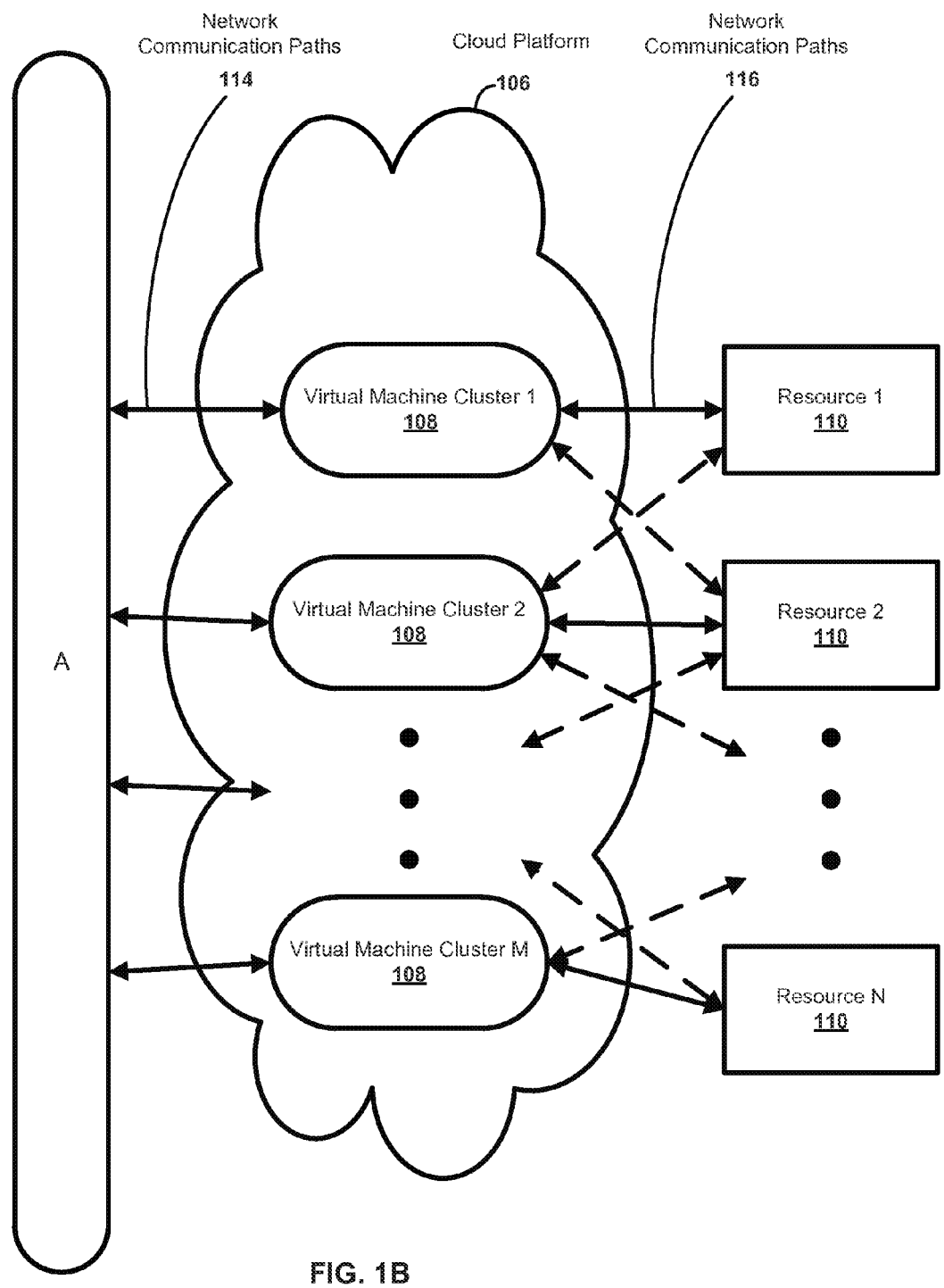
FIG. 1B illustrates an exemplary system.

In one aspect of the disclosure, a system can be configured to provide services, such as resources, to a computing device. The computing device can comprise a client device. FIGS. 1A and 1B illustrate various aspects of an exemplary environment in which the present methods and systems can operate. The present disclosure is relevant to systems and methods for providing a resource 110 to a computing device 102. A computing device 102 can be, for example, a customer agent facing tool, such as GrandSlam or Einstein, a customer driven provisioning tool, such as a self-service toolkit, a billing system, or the like. A resource 110 can be, for example, a computing device (e.g., a server), video controller, or the like. Those skilled in the art will appreciate that present methods can be used in various types of networks and systems that employ both digital and analog equipment. One skilled in the art will appreciate that provided herein is a functional description and that the respective functions can be performed by software, hardware, or a combination of software and hardware.

Figure 3:
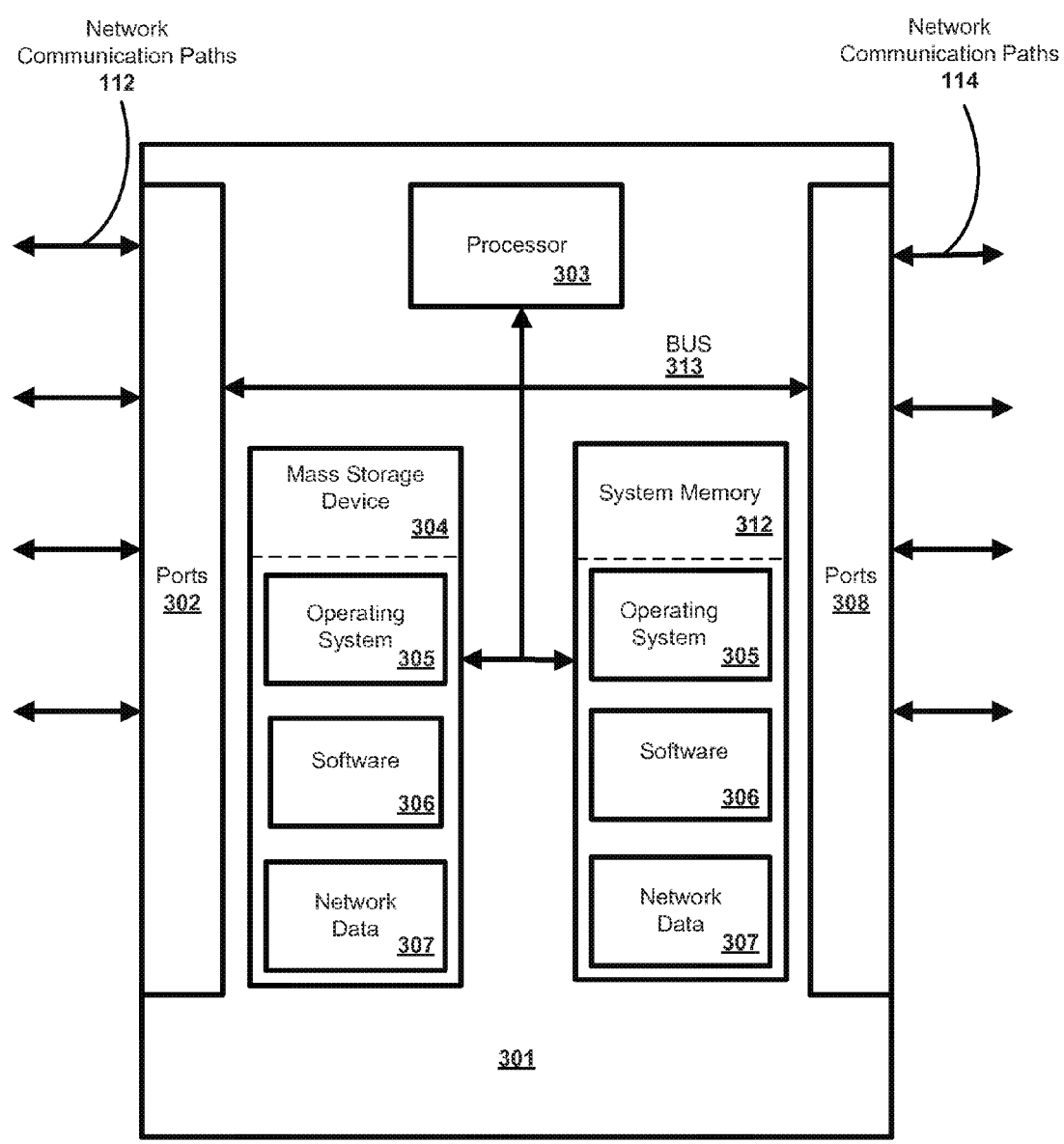
FIG. 3 illustrates a block diagram of an exemplary network load balancer.

In an aspect, the computing device 102 can be in communication with a network load balancer 104. The network load balancer 104 can be any computing device for routing network traffic, such as, for example, a server or router. The network load balancer 104 can communicate with the computing device 102 for providing data and/or services. The network load balancer 104 can allow the computing device 102 to interact with remote resources 110. The network load balancer 104 can be disposed locally or remotely relative to the computing device 102. As an example, the network load balancer 104 can be configured as (or disposed at) a central location, which can receive information from multiple computing devices 102 at a plurality of ports 302, as shown in FIG. 3. As an example, the computing device 102 and the network load balancer 104 can be in communication via a private and/or public network (e.g., network communication paths 112) such as the Internet or a local area network. Other forms of communications can be used such as wired and wireless telecommunication channels, for example. A cloud platform 106 can refer to any computer or combination of computers arranged in a network which store or execute programs. The network load balancer 104 can assess the current load of a cloud platform 106 and transmit information from ports 308 based on the assessed current load. A cloud platform 106 can refer to any computer or combination of computers arranged in a network that store or execute programs.

Turning briefly to FIG. 3, in an aspect, the network load balancer 104 can comprise a plurality of ports 302, 308. The plurality of ports 302, 308 can be implemented in hardware and/or software. In an aspect, the plurality of ports 302, 308 can comprise a TCP/IP socket and/or a TCP/IP socket listener. In an aspect, the plurality of ports 302, 308 can create a TCP/IP socket connection in response to a request from a computing device 102. In an aspect, the plurality of ports 302, 308 can act as an interface between the network communication paths 112, 114 and the system bus 313. The ports 302, 308 can be associated with an identifier. A network communication path can comprise a network binding, route, and/or the like. As an example, the identifier can be any identifier, token, character, string, or the like, for differentiating one port 302, 308 from another port 302, 308. In a further aspect, the identifier can identify a requesting computing device 102 as belonging to a particular type or class of computing device 102. In a further aspect, the identifier can identify a requested resource 110 as belonging to a particular type or class of resource 110. As a further example, the identifier can comprise information relating to the requesting computing device 102 or requested resource 110 such as a manufacturer, a model or type of computing device 102 or resource 110, a service provider associated with the computing device 102 or resource 110, capability of a computing device 102 or resource 110, service requested, a state of the computing device 102 or resource 110, a locator, and/or a label or classifier. Other information can be represented by the identifier.

In an aspect, the identifier can comprise an address element. In an aspect, the address element can comprise and/or provide an internet protocol address, a network address, a media access control (MAC) address, an Internet address, and/or the like. As an example, the address element can be relied upon to establish a communication session between the computing device 102 and the network load balancer 104 or other devices and/or networks. As a further example, the address element can be used as an identifier or locator of the computing device 102. In an aspect, the address element can be persistent for a particular network.

In an aspect, one or more identifiers can be or relate to an Internet Protocol (IP) Address, a media access control address (MAC address), and/or the like. For example, the IP address can be based on Internet Protocol version 4 (IPv4), Internet Protocol version 6 (IPv6), subsequent versions of Internet Protocol, other addressing protocols, and/or the like. As a further example, one or more identifiers can be a unique identifier for facilitating communications on the physical network segment.

In an aspect, a computing device 102 can request a resource 110. The computing device 102 can receive an identifier with the resource 110. The computing device 102 can direct communications for the resource 110 to the identifier associated with the resource 110. The network load balancer 104 can dynamically assign one or more of the plurality of ports 302, 308 to assist with communications directed to the identifier.

In an aspect, the network load balancer 104 can manage the communication between the computing device 102 and the resource 110 for sending and receiving information therebetween. As an example, the network load balancer 104 can dynamically bind an outgoing port 308 to one or more virtual machine clusters 108 located in the cloud platform 106. The resulting dynamically bound network communication path 114 and/or 116 (e.g., or network binding) can allow the network load balancer 104 to transmit messages to and receive messages from the one or more virtual machine clusters 108. The one or more virtual machine clusters 108 can dynamically bind to a resource 110. The resulting dynamically bound network communication path 116 can allow the one or more virtual machine clusters 108 to transmit messages to and receive messages from the resource 110. Communication between the network load balancer 104 and the one or more virtual machine clusters 108 via a network communication path 114 can be accomplished using any of the methods described for communication between the computing device 102 and the network load balancer 104 above. Indeed, a communication session can comprise communication between the computing device 102 and the network load balancer 104 on the network communication path 112 and communication between the network load balancer 104 and the virtual machine cluster 108 on the network communication path 114. Similarly, communication between the one or more virtual machine clusters 108 and the resource 110 via a network communication path 116 can be accomplished using any of the methods described herein for communication between the computing device 102 and the network load balancer 104.

In one aspect, the computing device 102 can comprise a billing system. The billing system can transmit a request for a resource 110, such as, for example, a video controller. The billing system can send the request for a video controller in a first communication session using a first messaging protocol. The first messaging protocol can comprise, for example, BOSS. The request sent via the first communication session can be received at a network load balancer 104. The network load balancer 104 can select a virtual machine cluster 108 to receive the request. The network load balancer 104 can consider one or more factors in deciding which virtual machine cluster 108 in the cloud platform 106 should receive the request for a video controller. For example, the network load balancer 104 can determine that the request uses the BOSS protocol, so the selected virtual machine cluster 108 can be configured to understand the BOSS protocol. In an example, the network load balancer 104 can dynamically bind a network communication path 114 to the selected virtual machine cluster 108 to complete the setup of the first communication session. The first communication session can comprise communication from the computing device 102 to the selected virtual machine cluster 108. The selected virtual machine cluster 108 can receive the message transmitted from the network load balancer 104 via the first communication session. The virtual machine cluster 108 can terminate the first communication session in the BOSS protocol and create a second communication session with an appropriate video controller. The second communication session can use a second protocol. In an aspect, the second protocol can be a proprietary messaging protocol. The virtual machine cluster 108 can forward the request to the video controller via the second communication session.

Figure 2:
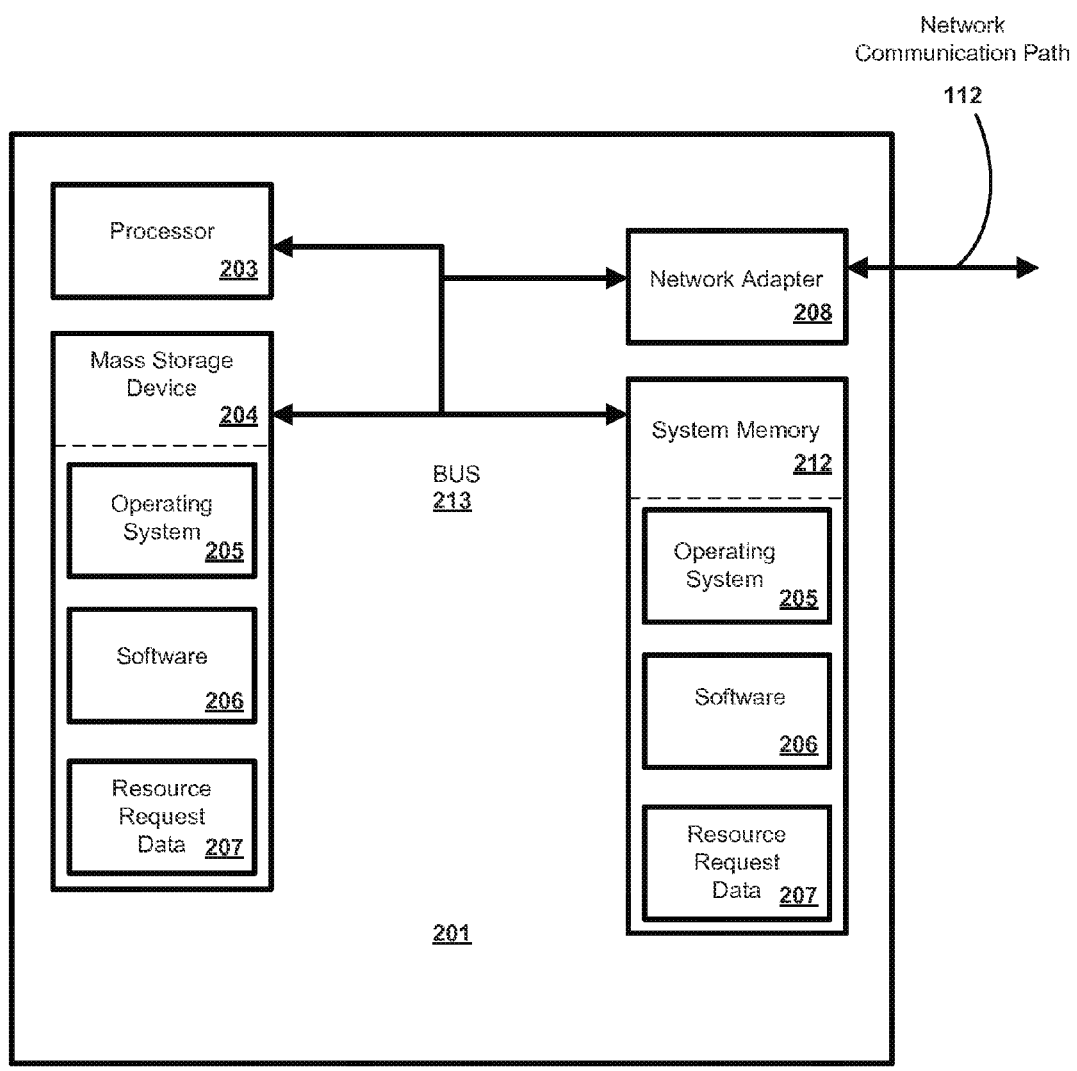
FIG. 2 illustrates a block diagram of an exemplary computing device.
Figure 5:
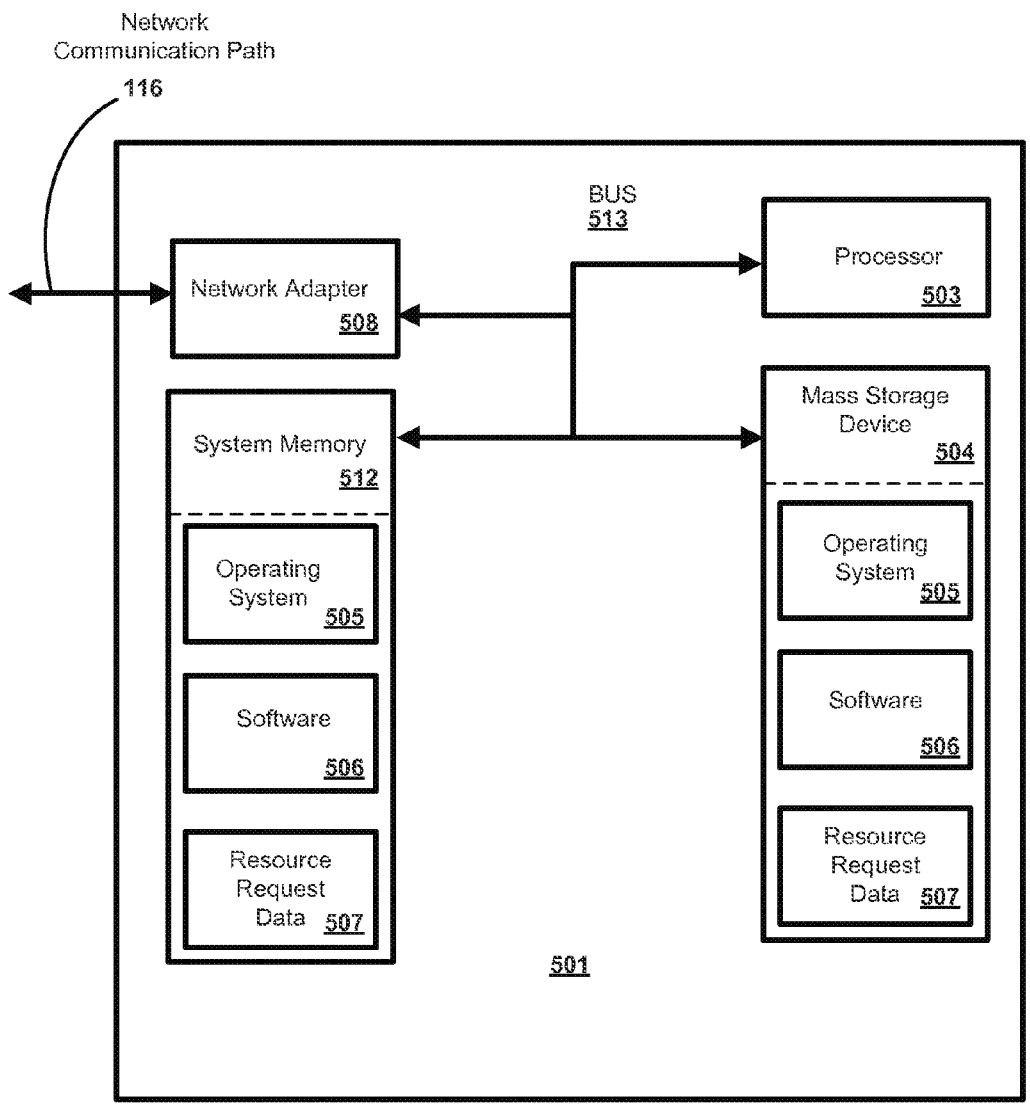
FIG. 5 illustrates a block diagram of an exemplary resource.

In an exemplary aspect, the methods and systems can be implemented on a computer 201, 301, or 501 as illustrated in FIGS. 2, 3, and 5, respectively, and described below. By way of example, computing device 102 of FIG. 1 can be a computer as illustrated in FIG. 2. Similarly, by way of example, network load balancer 104 can be a computer as illustrated in FIG. 3. Similarly, by way of example, resource 110 can be a computer as illustrated in FIG. 5. Similarly, the methods and systems disclosed can utilize one or more computers to perform one or more functions in one or more locations. FIGS. 2, 3, and 5 are each block diagrams illustrating an exemplary operating environment for performing the disclosed methods. These exemplary operating environments are only examples of an operating environment and are not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201, 301, 501. The components of the computer 201, 301, 501 can comprise, but are not limited to, one or more processors or processing units 203, 303, 503 a system memory 212, 312, 512, and a system bus 213, 313, 513 that couples various system components including the processor 203, 303, 503 to the system memory 212, 312, 512. In the case of multiple processing units 203, 303, 503, the system can utilize parallel computing.

The system bus 213, 313, 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, 313, 513, and all buses specified in this description can also be implemented over a wired or wireless network connection and each of the subsystems, including the processor 203, 303, 503, a mass storage device 204, 304, 504, an operating system 205, 305, 505, software 206, 306, 506, data, including resource request data 207 and 507, and network data 307, ports 302, 308, a network adapter 208, 508, system memory 212, 312, 512, can be contained within one or more computers 201, 301, 501 at physically separate locations, connected through buses of this form, in effect implementing a fully distributed system.

The computer 201, 301, 501 typically comprises a variety of computer readable media. Exemplary readable media can be any available media that is accessible by the computer 201, 301, 501 and comprises, for example and not meant to be limiting, both volatile and non-volatile media, removable and non-removable media. The system memory 212, 312, 512 comprises computer readable media in the form of volatile memory, such as random access memory (RAM), and/or non-volatile memory, such as read only memory (ROM). The system memory 212, 312, 512 typically contains data such as resource request data 207 and 507, and network data 307, and/or program modules such as operating system 205, 305, 505 and software 206, 306, 506 that are immediately accessible to and/or are presently operated on by the processing unit 203, 303, 503.

In another aspect, the computer 201, 301, 501 can also comprise other removable/non-removable, volatile/non-volatile computer storage media. By way of example, FIGS. 2, 3, and 5 illustrate a mass storage device 204, 304, 504 which can provide non-volatile storage of computer code, computer readable instructions, data structures, program modules, and other data for the computer 201, 301, 501. For example and not meant to be limiting, a mass storage device 204, 304, 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, 304, 504, including by way of example, an operating system 205, 305, 505 and software 206, 306, 506. Each of the operating system 205, 305, 505 and software 206, 306, 506 (or some combination thereof) can comprise elements of the programming and the software 206, 306, 506. Data 207, 307, 507 can also be stored on the mass storage device 204, 304, 504. Data 207, 307, 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

The computing device 102 can transmit data 207 via the network communication path 112. The data 207 can be, for example, a request for a resource 110 transmitted using in a first messaging protocol.

The network load balancer 104 can receive data via a network communication path 112 at a port 302. The network load balancer 104 can transmit the received data via a network communication path 114 from a port 308.

The network load balancer 104 can additionally track the network traffic and store the tracked information as network data 307. The network load balancer 104 can include a port mapper for directing information received from one port 302 to an appropriate outgoing port 308 based on the network data 307. The port mapper can be a set of instructions stored in system memory 312, for example. The network load balancer 104 can additionally include a protocol configuration to track whether or not a particular path can be appropriate for a message using a particular messaging protocol. The protocol configuration can be a set of instructions stored in system memory 312, for example.

The resource 110 can receive data 507 via a network communication path 116 using a second messaging protocol. The received data 507 can be a request from a computing device 102 for the resource 110.

In another aspect, the user can enter commands and information into the computer 201, 301, 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203, 303, 503 via a human machine interface that is coupled to the system bus 213, 313, 513, but can be connected by other interface and bus structures, such as a parallel port, game port, an IEEE 1394 Port (also known as a Firewire port), a serial port, or a universal serial bus (USB).

In yet another aspect, a display device can also be connected to the system bus 213, 313, 513 via an interface, such as a display adapter. It is contemplated that the computer 201, 301, 501 can have more than one display adapter and the computer 201, 301, 501 can have more than one display device. For example, a display device can be a monitor, an LCD (Liquid Crystal Display), or a projector. In addition to the display device, other output peripheral devices can comprise components such as speakers (not shown) and a printer (not shown) which can be connected to the computer 201, 301, 501 via Input/Output Interface. Any step and/or result of the methods can be output in any form to an output device. Such output can be any form of visual representation, including, but not limited to, textual, graphical, animation, audio, tactile, and the like. The display and computer 201, 301, 501 can be part of one device, or separate devices.

For purposes of illustration, application programs and other executable program components such as the operating system 205, 305, 505 are illustrated herein as discrete blocks, although it is recognized that such programs and components reside at various times in different storage components of the computing device 201, 301, 501, and are executed by the data processor(s) of the computer. An implementation of software 206, 306, 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 4:
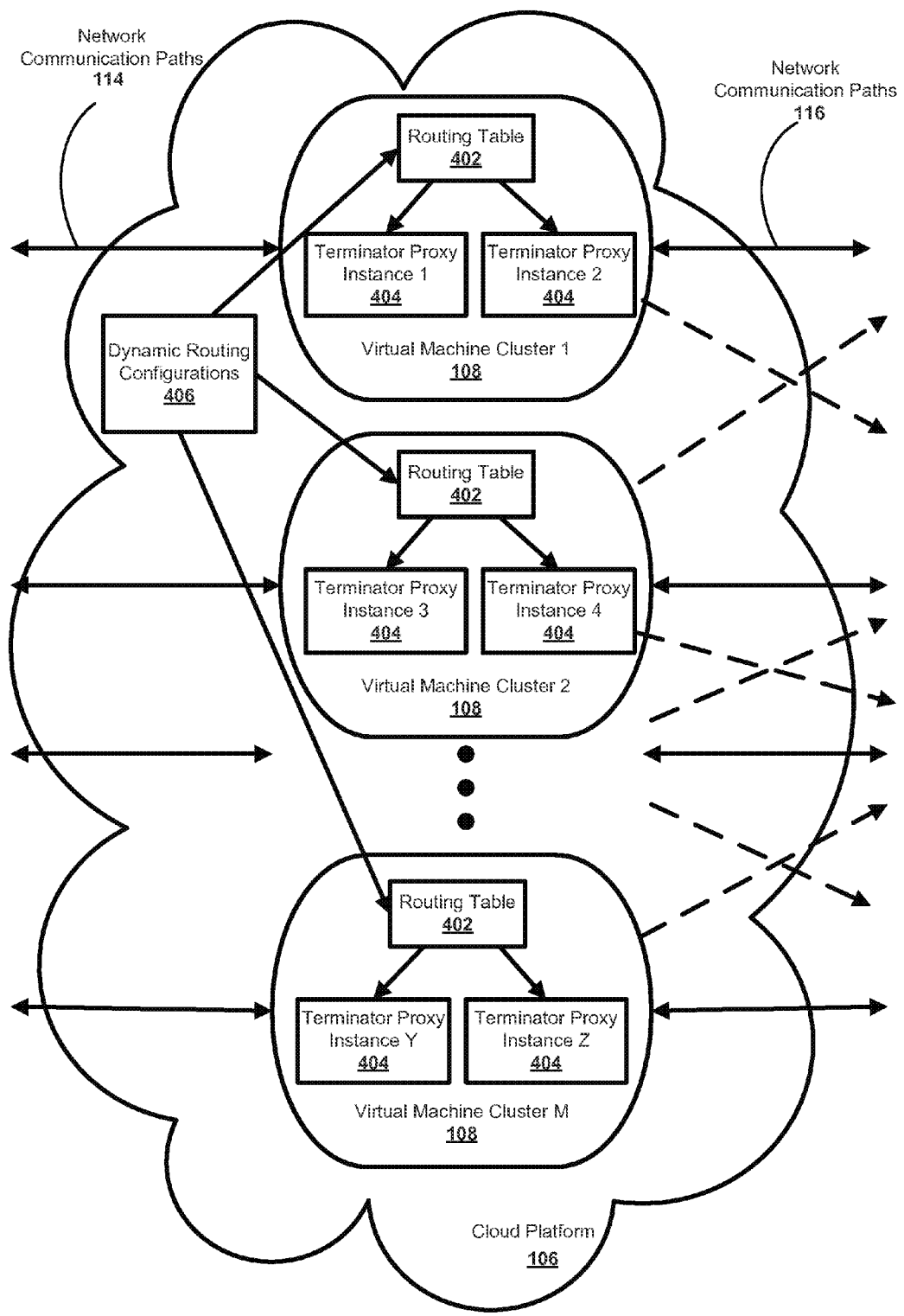
FIG. 4 illustrates a block diagram of an exemplary cloud platform.

Turning now to FIG. 4, an exemplary embodiment of a cloud platform 106 in illustrated. The cloud platform 106 can comprise a plurality of virtual machine clusters 108. A virtual machine cluster 108 can comprise a routing table 402 and a plurality of terminator proxy instances 404. A virtual machine cluster 108 can be configured via the routing table 402 to communicate with one or more resources 110 via the terminator proxy instances 404. The routing table 402 can direct information received from the network load balancer 104 (e.g., shown in FIG. 1A) via network communication path 114 to one of a plurality of terminator proxy instances 404 based on dynamic routing configurations 406 maintained within the cloud platform 106. In an aspect, the dynamic routing configurations 406 can be reconfigured by changing and/or updating routing information in the routing tables 402 of one or more virtual machine cluster 108. In an aspect, the routing information can comprise rows (e.g., or other configuration of data) that define details for sending a message from a source address, location, and/or port to one or more destination address, location, and/or port. By way of explanation, one or more (or each) virtual machine cluster 108 can be associated with virtual address, such as a virtual IP address. The network load balancer 104 can provide messages and/or requests to the virtual machine clusters 108 based on the virtual addresses. In one aspect, the virtual addresses can be stored in a routing table of the network load balancer 104.

In an aspect, the terminator proxy instances 404 can be configured to act as a proxy between a resource 110 and a computing device 102. For example, the terminator proxy instances 404 can be configured to terminate a first communication session (e.g., upstream from the computing device) initiate a second communication session (e.g., downstream to the resource 110). Terminating a communication session can comprise ending a communication session, acting as an endpoint for a communication session, and/or the like. For example, termination can comprise converting a message from the first communication session based on a first protocol to a message in a second communication based on a second protocol.

As various resources 110 and/or computing devices 102 may have different capabilities (e.g., use different protocols), the terminator proxy instances 404 can be configured to communicate based a particular protocol and/or a variety of protocols. A first protocol can be HTTP, Wirelink, BOSS, a proprietary messaging protocol, or any other known messaging protocol. In an aspect, the second protocol can be any messaging protocol that uses remote procedure calls. In another aspect, the second protocol can be any video controller protocol that uses remote procedure calls.

At a terminator proxy instance 404, information can be extracted from a message received via the first communication session (e.g., or in the initiation of the first communication session). The information can comprise routing information, session information (e.g., for keeping track of the message source and/or computing device initiating the session), information as part of a message to a resource, and/or the like. The terminator proxy instance 404 can augment the information received via the first communication session with additional data. The terminator proxy instance 404 can transmit the information, with or without additional data, to a resource 110 using a second communication session. The second communication session can use a second messaging protocol. The second messaging protocol can be any messaging protocol listed above. For example, the terminator proxy instance 404 can be configured to generate a message comprising information from a first message and, in some scenarios, additional data. The additional data can comprise, for example, information related and/or unrelated to the first communication session and/or second communication session. The additional data can comprise billing data, system upgrade data, messaging related to one or more services and/or resources on the same device and/or local area network of the resource, content information (e.g., for display and/or processing by the resource), transaction information, user account information, and/or the like. For example, the additional data can comprise additional content for display via the resource (e.g., video controller) to a user. Additional data can comprise, for instance, entitlement data. In an aspect, augmented data can comprise one or more of channel lineups, video conversion mapping data, customer account information, device information, or any information that is not present in the information communicated through the first communication session. In a further aspect, video conversion mapping data can comprise resolution conversion mapping data. In a further aspect, resolution conversion mapping data can comprise data for mapping from one resolution to a higher resolution. In a further aspect, data for mapping from one resolution to a higher resolution can comprise data for mapping from standard definition to high definition. In an aspect, resolution conversion mapping data can comprise data for mapping one resolution to a lower resolution. In a further aspect, data for mapping from one resolution to a lower resolution can comprise data for mapping high definition to standard definition. In an aspect, video conversion mapping data can comprise frame rate mapping data. In a further aspect, frame rate mapping data can comprise data for mapping a frame rate to a higher frame rate. In an aspect, frame rate mapping data can comprise data for mapping a frame rate to a lower frame rate.

In some scenarios, the network load balancer 104 and/or terminator proxy instance 404 can be configured with a port mapper. The port mapper can be configured to ensure that messages originating from a particular computing device 102 reach a target resource 110 as well as ensure a pathway back to the original computing device 102 from the resource 110. For example, the port mapper can provide mapping for communication sessions based on remote procedure call protocol or other similar protocols. For example, the port mapper can be utilized for communicating via BOSS over RPC protocol for communicating with a DNCS based controller.

Figure 6:
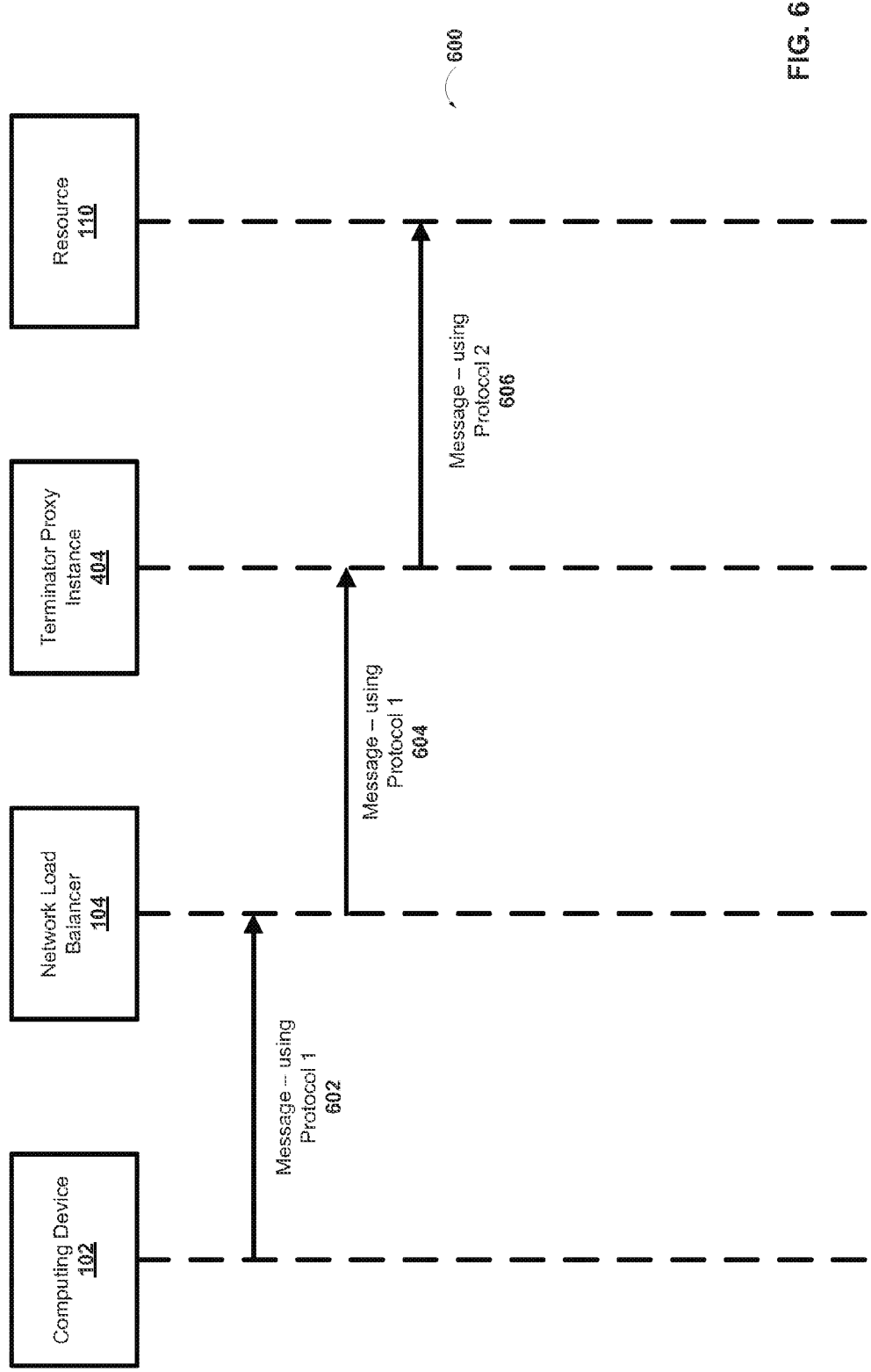
FIG. 6 illustrates an exemplary embodiment of a sequence diagram of protocol termination.

Turning now to FIG. 6, an exemplary embodiment of a sequence diagram 600 is illustrated. At 602, a message can be transmitted from a computing device 102 to a network load balancer 104. For example, the message can be transmitted using a first protocol, such as a first messaging protocol. The message can be transmitted to the network load balancer 104 via a first communication session. In an exemplary embodiment, the message can be a request for a resource 110. A resource can comprise an element of a device, such as a user device, service provider device, content device, set top box, television, display, server, proxy, and/or the like. The resource can provide a service to the computing device on which the element is located and/or services to remote devices. The resource can comprise a controller (e.g., digital controller, video controller, audio controller, network controller), interface (e.g., video interface, audio interface, network interface), module comprising computer readable source code, display element, user interface, and/or the like. As a further example, the resource can comprise a digital network control system (DNCS), digital addressable controller (DAC), or other addressable controller. For example, the computing device 102 can be a billing system. In one aspect, the resource 110 can be a video controller configured to communicate with the billing system. For example, the video controller can be configured to communicate and/or process transaction information (e.g., purchase of video and/or audio content) to or for a user, such as a customer. In one aspect, the message can be a request for and/or message to a video controller (e.g., related to a content purchase).

At 604, the message can be transmitted from the network load balancer 104 to a terminator proxy instance 404. For example, the message can be transmitted based on the first protocol. As a further example, the message can be transmitted via a first communication session. The first communication session can comprise a communication session between the computing device 102, the network load balancer 104, and/or the terminator proxy instance 404. In an aspect, the network load balancer 104 can consider the current traffic of the network in deciding which terminator proxy instance 404 should receive the message. In an aspect, the network load balancer 104 can consider the messaging protocol (e.g., first protocol) of the message in selecting a terminator proxy instance 404 to receive the message. After determining which terminator proxy instance 404 should receive the message, the network load balancer 104 can dynamically bind to the terminator proxy instance 404. The network load balancer 104 can transmit the message through the dynamically bound path. Upon receiving the message, the terminator proxy instance 404 can terminate the first communication session.

At 606, the terminator proxy instance 404 can transmit the message to a resource 110 using a dynamically bound path. For example, the message to the resource can be transmitted based on a second protocol. The message can be transmitted to the resource 110 via a second communication session. The second communication session can comprise a communication session between the terminator proxy instance 404 and the resource 110. In dynamically binding a path, pertinent message fields of a message can be extracted for consideration. For instance, a message can comprise, be directed to, and/or otherwise be associated with a MAC address of the sending device as one of its message fields. Selecting a dynamically bound path to a resource can include extracting the MAC address and considering the value of the MAC address message. Other examples of values that can be considered include franchise tax area, region ID, market ID, and account type. Values considered in selecting a dynamically bound path can be extracted from message fields or calculated from values extracted from message fields. The message can be transmitted to the resource 110 using a second messaging protocol.

Figure 7:
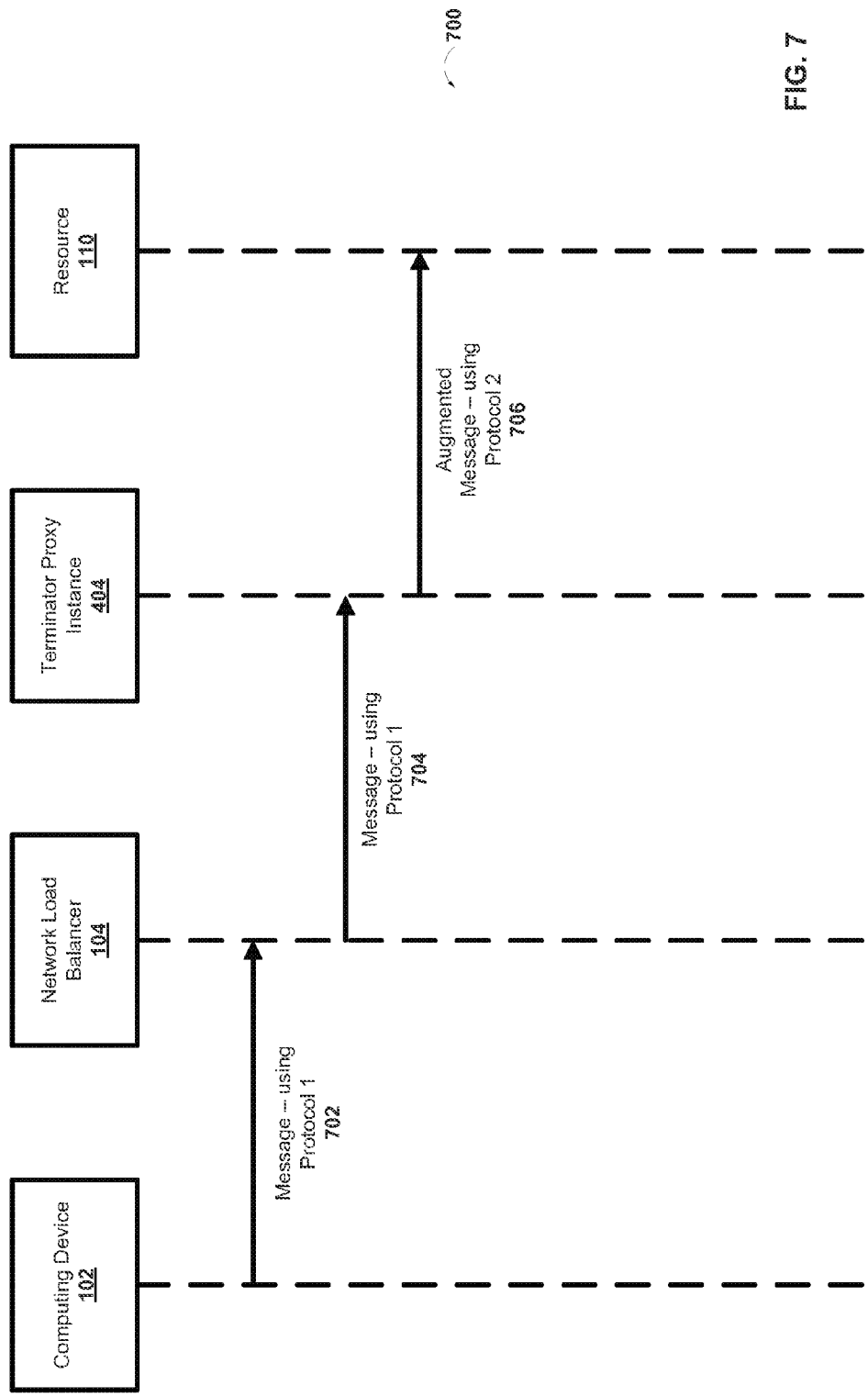
FIG. 7 illustrates another exemplary embodiment of a sequence diagram of protocol termination and message augmentation.

Turning now to FIG. 7, an exemplary embodiment of a sequence diagram 700 is illustrated. At 702, a message can be transmitted from a computing device 102 to a network load balancer 104. For example, the message can be transmitted using a first protocol. The message can be transmitted to the network load balancer 104 via a first communication session. In an exemplary embodiment, the message can be a request for a resource 110. A resource can comprise an element of a device, such as a user device, service provider device, content device, set top box, television, display, server, proxy, and/or the like. The resource can provide a service to the computing device on which the element is located and/or services to remote devices. The resource can comprise a controller (e.g., digital controller, video controller, audio controller, network controller), interface (e.g., video interface, audio interface, network interface), module comprising computer readable source code, display element, user interface, and/or the like. As a further example, the resource can comprise a digital network control system (DNCS), digital addressable controller (DAC), or other addressable controller. For example, the computing device 102 can be a billing system. In one aspect, the resource 110 can be a video controller configured to communicate with the billing system. For example, the video controller can be configured to communicate and/or process transaction information (e.g., purchase of video and/or audio content) to or for a user, such as a customer. In one aspect, the message can be a request for a video controller (e.g., related to a content purchase).

At 704, the message can be transmitted from the network load balancer 104 to a terminator proxy instance 404. For example, the message can be transmitted based on the first protocol. As a further example, the message can be transmitted via the first communication session. The first communication session can comprise a communication session between the computing device 102, the network load balancer 104, and/or the terminator proxy instance 404. In an aspect, the network load balancer 104 can consider the current traffic of the network in deciding which terminator proxy instance 404 should receive the message. In an aspect, the network load balancer 104 can consider the messaging protocol (e.g., first protocol) of the message in selecting a terminator proxy instance 404 to receive the message. After determining which terminator proxy instance 404 should receive the message, the network load balancer 104 (e.g., or other device in a virtual machine cluster) can dynamically bind (e.g., a communication session, a message sent to a resource from a computing device 102) to the terminator proxy instance 404. The network load balancer 104 can transmit the message through the dynamically bound path. Upon receiving the message, the terminator proxy instance 404 can terminate the first communication session.

At 706, the terminator proxy instance 404 can augment the message, thereby generating an augmented message. For example, the terminator proxy instance 404 can add, insert, append, and/or the like information to the message. As another example, the terminator proxy instance 404 can generate the augmented message as a new message comprising the information from message transmitted to the load balancer and the additional information. The additional information can comprise billing data, system upgrade data, messaging related to one or more services and/or resources on the same device and/or local area network of the resource, content information (e.g., for display and/or processing by the resource), transaction information, user account information, and/or the like. For example, the additional information can comprise additional content for display via the resource (e.g., video controller) to a user. Additional information can comprise, for instance, entitlement data. In an aspect, additional information can comprise one or more of channel lineups, video conversion mapping data, customer account information, device information, or any information that is not present in the information communicated through the first communication session. In a further aspect, video conversion mapping data can comprise resolution conversion mapping data. In a further aspect, resolution conversion mapping data can comprise data for mapping from one resolution to a higher resolution. In a further aspect, data for mapping from one resolution to a higher resolution can comprise data for mapping from standard definition to high definition. In an aspect, resolution conversion mapping data can comprise data for mapping one resolution to a lower resolution. In a further aspect, data for mapping from one resolution to a lower resolution can comprise data for mapping high definition to standard definition. In an aspect, video conversion mapping data can comprise frame rate mapping data. In a further aspect, frame rate mapping data can comprise data for mapping a frame rate to a higher frame rate. In an aspect, frame rate mapping data can comprise data for mapping a frame rate to a lower frame rate.

The terminator proxy instance 404 can transmit the augmented message to a resource 110 using a dynamically bound path. For example, the augmented message can be transmitted to the resource based on a second protocol, such as a second messaging protocol. The augmented message can be transmitted to the resource 110 via a second communication session. The second communication session can comprise a communication session between the terminator proxy instance 404 and the resource 110. In dynamically binding a path, pertinent message fields of a message can be extracted for consideration. For instance, a message can comprise, be directed to, and/or otherwise be associated with a MAC address of the sending device as one of its message fields. Selecting a dynamically bound path to a resource can include extracting the MAC address and considering the value of the MAC address message. Other examples of values that can be considered include franchise tax area, region ID, market ID, and account type. Values considered in selecting a dynamically bound path can be extracted from message fields or calculated from values extracted from message fields. The message can be transmitted to the resource 110 using a second messaging protocol.

Figure 8:
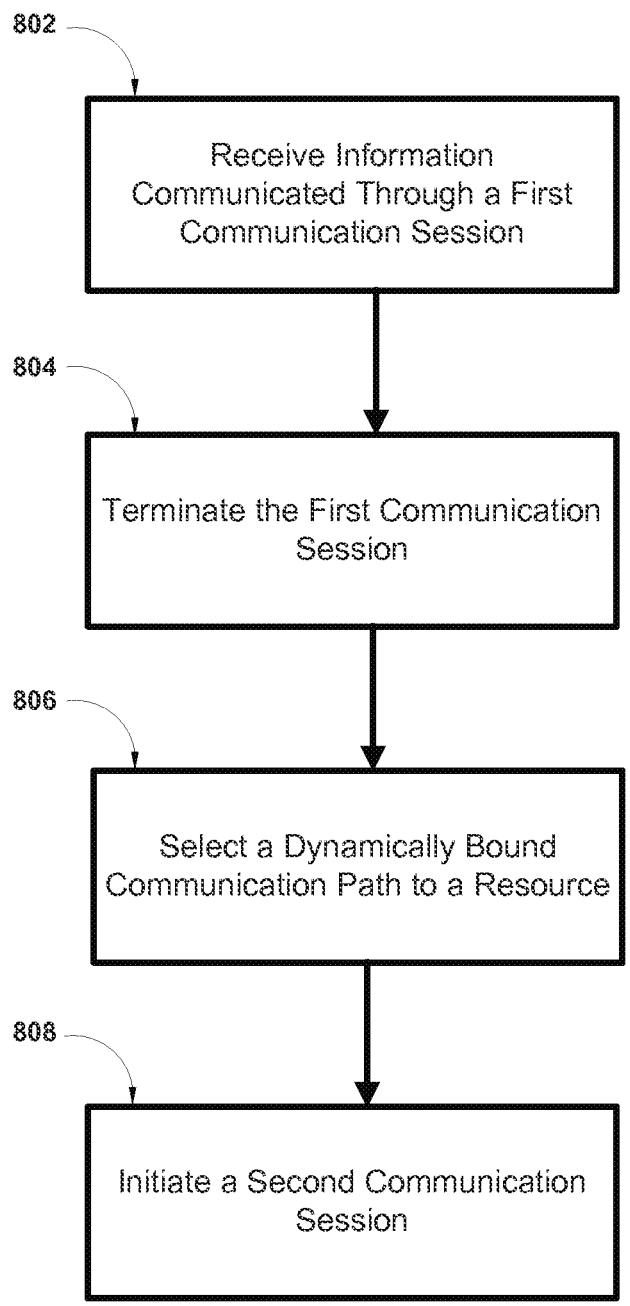
FIG. 8 illustrates an exemplary embodiment of a flow diagram of a process performed at a virtual machine cluster.

Turning now to FIG. 8, an exemplary embodiment of a flow chart of a process that can be performed at a virtual machine cluster 108 is illustrated. At step 802, information can be received via a first communication session. The first communication session can use a first messaging protocol. The information can be a request for a resource from a third-party client. The information can be received from a network load balancer 104. The first messaging protocol can be Wirelink, BOSS, or any messaging protocol. The information can be provided by and/or received from a billing system. For example, the load balancer can receive the information from the billing system, and the load balancer can provide the information to the virtual machine cluster.

The resource can be configured to provide an interface for a user to purchase access to content A resource can comprise an element of a device, such as a user device, service provider device, content device, set top box, television, display, server, proxy, and/or the like. The resource can provide a service to the computing device on which the element is located and/or services to remote devices. The resource can comprise a controller (e.g., digital controller, video controller, audio controller, network controller), interface (e.g., video interface, audio interface, network interface), module comprising computer readable source code, display element, user interface, and/or the like. As a further example, the resource can comprise a digital network control system (DNCS), digital addressable controller (DAC), or other addressable controller.

At step 804, the first communication session can be terminated. In one aspect, the first communication session can be terminated at a virtual machine of a group of virtual machines. The group (e.g., cluster) of virtual machine can be created in a cloud environment hosted internally by a service provider. One or more (or each) virtual machine can run on a chosen operating system. One or more (or each) virtual machine can be imaged with software to run and/or implement a proxy, such as a terminator proxy instance. The virtual machines can be implemented on more or more computing devices, such as a server and/or combination of services. The virtual machines can be grouped into a set of clusters that service video controllers downstream. As an illustration, the information is provided to the group of virtual machines by a load balancer. The load balancer can be configured to provide the information to the group of virtual machines based on a port at which the information is received by the load balancer. The information can be provided to the virtual machine based on a virtual address associated with the group of virtual machines.

At step 806, a dynamically bound communication path to a resource 110 can be selected. The dynamically bound communication path can be selected based on a dynamically reconfigurable routing table for the group of virtual machines. In dynamically binding a communication path, pertinent message fields of a message can be extracted for consideration. For instance, a message can comprise, be directed to, or otherwise be associated with a MAC address of the sending device as one of its message fields. Selecting a dynamically bound communication path to a resource can include extracting the MAC address and considering the value of the MAC address message. Other examples of values that can be considered include franchise tax area, region ID, market ID, and account type. Values considered in selecting a dynamically bound communication path can be extracted from message fields or calculated from values extracted from message fields. Optionally, the received information can be augmented with additional data. The additional data can comprise billing data, system upgrade data, messaging related to one or more services and/or resources on the same device and/or local area network of the resource, content information (e.g., for display and/or processing by the resource), transaction information, user account information, and/or the like. For example, the additional information can comprise additional content for display via the resource (e.g., video controller) to a user. Additional augmented data can comprise, for instance, entitlement data. In an aspect, augmented data can comprise one or more of channel lineups, video conversion mapping data, customer account information, device information, or any information that is not present in the information communicated through the first communication session. In a further aspect, video conversion mapping data can comprise resolution conversion mapping data. In a further aspect, resolution conversion mapping data can comprise data for mapping from one resolution to a higher resolution. In a further aspect, data for mapping from one resolution to a higher resolution can comprise data for mapping from standard definition to high definition. In an aspect, resolution conversion mapping data can comprise data for mapping one resolution to a lower resolution. In a further aspect, data for mapping from one resolution to a lower resolution can comprise data for mapping high definition to standard definition. In an aspect, video conversion mapping data can comprise frame rate mapping data. In a further aspect, frame rate mapping data can comprise data for mapping a frame rate to a higher frame rate. In an aspect, frame rate mapping data can comprise data for mapping a frame rate to a lower frame rate.

At step 808, a second communication session can be initiated via the dynamically bound path. In one aspect, the second communication session can be initiated at the virtual machine. The information can be transmitted to the resource 110 over the selected path using a second communication session. The second communication session can use a second messaging protocol. Using the systems and methods provided, the second messaging protocol can be a messaging protocol unknown (e.g., not specifically communicated during a communication session such as the first communication session, or not programmed to recognize) to the third-party client requesting the resource. For example, one or more intermediary devices (e.g., terminator proxy instance 404, network load balancer 104) can act as a proxy such that the first communication session appears (e.g., from the perspective of the third-party client) to be between the third-party client and the resource. As a further example, the third-party client can be unaware of the second communication session and/or unaware that the second communication session is based on a protocol other than the first protocol, such as the second protocol. Therefore, the third-party client and the resource can communicate even if the two are using different messaging protocols.

Figure 9:
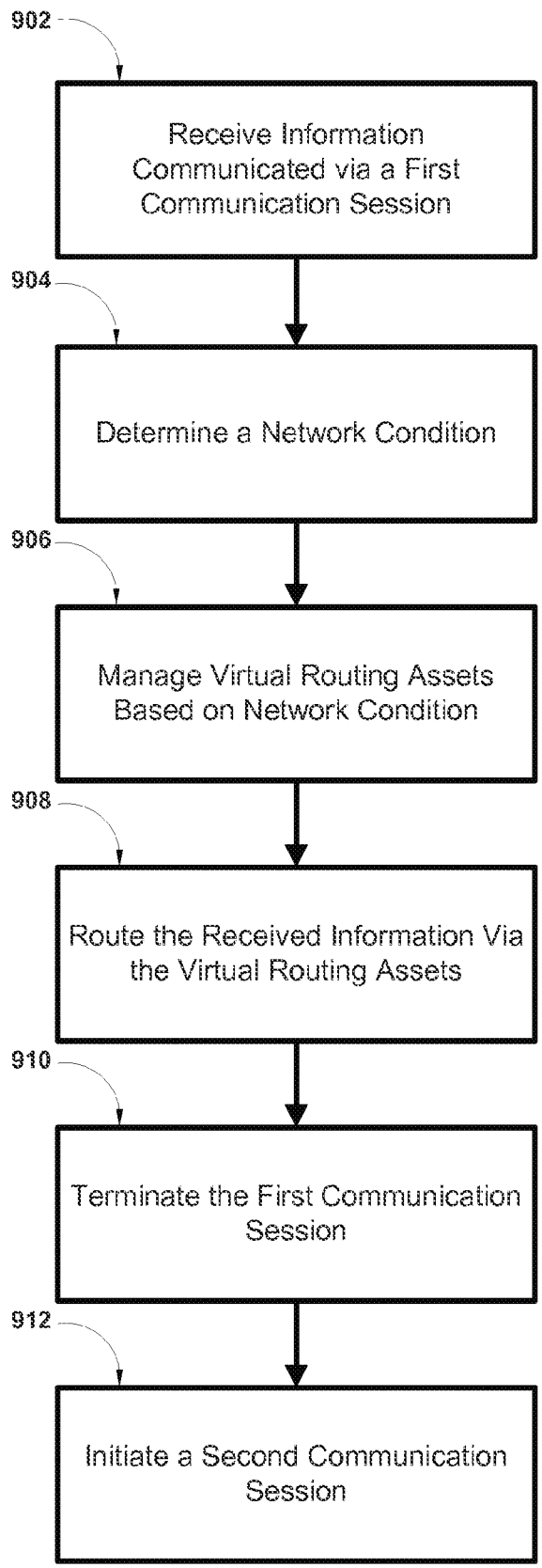
FIG. 9 illustrates another exemplary embodiment of a flow diagram of a process performed in a cloud platform.

Turning now to FIG. 9, an exemplary embodiment of a flow chart of a process that can be performed by the cloud platform 106 is illustrated. At step 902, information can be received via a first communication session. The information can be received from a dedicated port of a router The first communication session can use a first messaging protocol. The information can be a request for a resource from a third-party client. The information can be received from a network load balancer 104. The first messaging protocol can be Wirelink, BOSS, or any messaging protocol.

A resource can comprise an element of a device, such as a user device, service provider device, content device, set top box, television, display, server, proxy, and/or the like. The resource can provide a service to the computing device on which the element is located and/or services to remote devices. The resource can comprise a controller (e.g., digital controller, video controller, audio controller, network controller), interface (e.g., video interface, audio interface, network interface), module comprising computer readable source code, display element, user interface, and/or the like. As a further example, the resource can comprise a digital network control system (DNCS), digital addressable controller (DAC), and/or other addressable controller.

At step 904, a network condition can be determined. The network condition can be the availability of particular resources 110, a virtual machine cluster 108, a routing table 402, a terminator proxy instance 404, or any other device located within the cloud platform 106, such as routers. The network condition can be the current load of a network. In an aspect, the network condition can be, for instance, the first messaging protocol. In an aspect, the network condition can be, for instance, a plurality of messaging protocols a terminator proxy instance 404 can be capable of handling. The network condition can be routing condition, such as target address and/or particular a resource.

At step 906, a plurality of virtual routing assets can be managed (e.g., selected, updated, reconfigured) based on the network condition. Managing virtual routing assets can comprise dynamically selecting, updating, reconfiguring routing configurations 406 in the routing tables 402 of the virtual machine clusters 108, thereby altering which terminator proxy instance 404 is bound to a resource, address, port, and/or the like. In managing virtual routing assets, pertinent message fields of a message can be extracted for consideration in dynamic routing. For instance, a message can comprise, be directed to, and/or otherwise be associated with a MAC address of the sending device as one of its message fields. Managing virtual resources can include extracting the MAC address and considering the value of the MAC address message field in determining how to dynamically route the message. Other examples of values that can be considered include franchise tax area, region ID, market ID, and account type. Values considered in managing virtual resources can be extracted from message fields or calculated from values extracted from message fields. The network condition can comprise a change in network traffic, an allocation of traffic to one or more virtual routing assets, a processing availability of one or more virtual routing assets, a number of addresses, identifiers, and/or ports allocated by the load balance for a specific type of transaction (e.g., transactions from a billing system), and/or the like. The network condition can be compared to one or more thresholds, business logic (e.g., financial consequences of routing configuration), and/or the like.

As an illustration, managing can comprise reconfiguring the routing configurations to accommodate increased and/or decreased traffic through the network. The routing configurations can be reconfigured from a remote device via an update. The routing configurations can be reconfigured based on changes in hardware and/or software (e.g., protocol change, addition of a new service, removal of a service, upgrade to a service, replacement of a device comprising the resource) at a resource, and/or the like.

As a further example, managing can comprise selecting the plurality of virtual routing assets and/or reconfiguring a binding associated with the virtual routing assets. The binding can comprise an address, port, data type, protocol, and/or the like configured to determine how and where information is transmitted via the virtual routing assets. For example, the binding can be stored as a routing configuration.

At step 908, the received information can be routed via the plurality of virtual routing assets based on the determined network condition. At step 910, the first communication session can be terminated. Optionally, the received information can be augmented with additional data. Additional augmented data may be, for instance, entitlement data. At step 912, a second communication session can be initiated to transmit the information to the resource 110. The second communication session can be based on a second messaging protocol. The second messaging protocol can be a messaging protocol unknown (e.g., not specifically communicated during a communication session such as the first communication session, or not programmed to recognize) to the third-party client requesting the resource. For example, one or more intermediary devices (e.g., terminator proxy instance 404, network load balancer 104) can act as a proxy such that the first communication session appears (e.g., from the perspective of the third-party client) to be between the third-party client and the resource. As a further example, the third-party client can be unaware of the second communication session and/or unaware that the second communication session is based on a protocol other than the first protocol, such as the second protocol. Therefore, the third-party client and the resource can communicate even if the two are using different messaging protocols.

Figure 10:
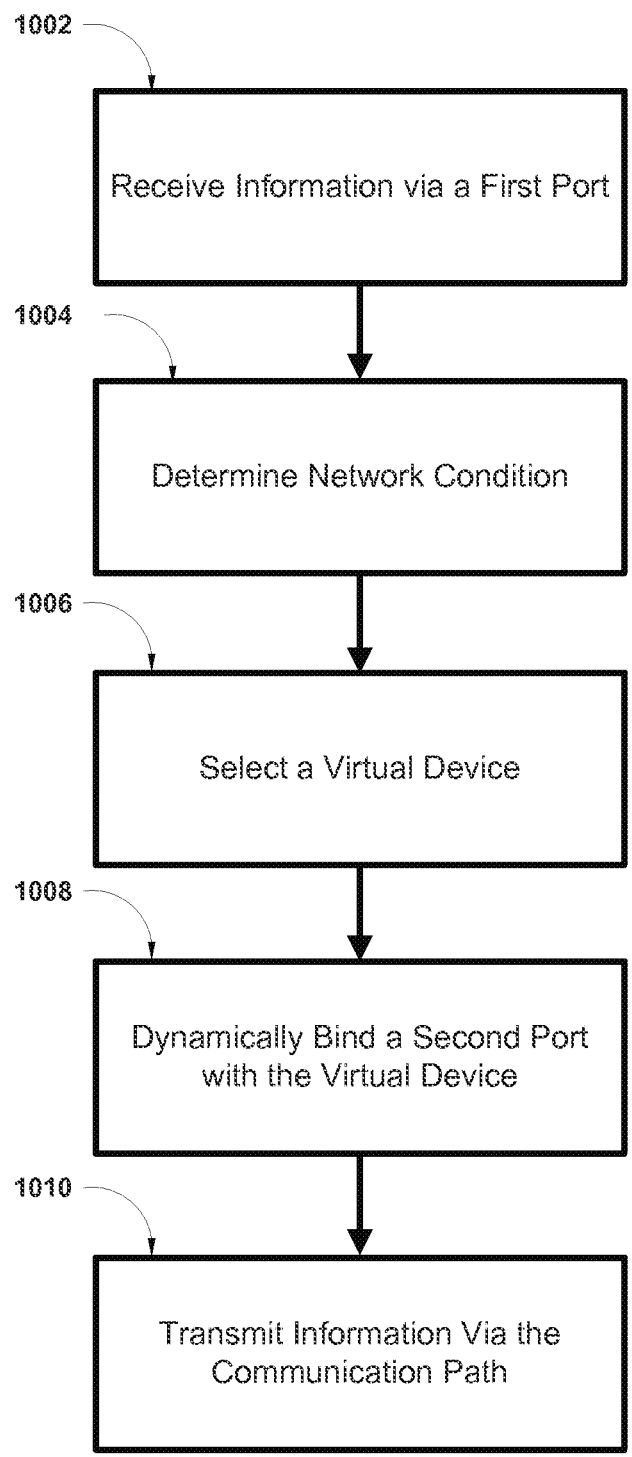
FIG. 10 illustrates another exemplary embodiment of a flow diagram of a process performed at a network load balancer.

Turning now to FIG. 10, an exemplary embodiment of a flow chart of a process that can be performed by the network load balancer 104 is illustrated. At step 1002, information can be received via a first port 302 using a first communication session. The information can be sent from a first device (e.g., computing device 102). The information can be received by a second device (e.g., network load balancer 104). The first port 302 can be associated with an identifier. For example, the identifier can be an identifier of a resource. The identifier can comprise an addressable identifier. The first communication session can be associated with a first messaging protocol. The first messaging protocol can be Wirelink, BOSS (e.g., RPC), or any messaging protocol.

At step 1004, a network condition can be determined (e.g., by the second device). The network condition can be the availability of particular resources 110, a virtual machine cluster 108, a routing table 402, a terminator proxy instance 404, or any other device located within the cloud platform 106, such as routers. A resource can comprise an element of a device, such as a user device, service provider device, content device, set top box, television, display, server, proxy, and/or the like. The resource can provide a service to the computing device on which the element is located and/or services to remote devices. The resource can comprise a controller (e.g., digital controller, video controller, audio controller, network controller), interface (e.g., video interface, audio interface, network interface), module comprising computer readable source code, display element, user interface, and/or the like. As a further example, the resource can comprise a digital network control system (DNCS), digital addressable controller (DAC), and/or other addressable controller.

The network condition can be the current load of a network (e.g., workload and/or current tasks assigned to various virtual machine clusters 108). In an aspect, the network condition can be, for instance, the particular first messaging protocol. In an aspect, the network condition can be, for instance, the messaging protocol a terminator proxy instance 404 is configured to handle. The network condition can be a routing condition, such as target address and/or particular resource. At step 1006, a virtual device can be selected based on the determined network condition. At step 1008, a second port 308 can be dynamically bound to the selected virtual device, resulting in a dynamically bound communication path. Optionally, the received information can be augmented with additional data. Additional augmented data may be, for instance, entitlement data.

At step 1010, the received information can be transmitted via the dynamically bound communication path 114 to a selected virtual device via the first communication session. In an example, the dynamically bound communication path 114 can complete setup of the first communication session. The first communication session can be subsequently terminated (e.g., by the selected virtual device). The information can be further transmitted (e.g., by the selected virtual device) to a resource 110 via a second communication session. The second communication session can be based on a second messaging protocol. The second messaging protocol can be a messaging protocol unknown (e.g., not specifically communicated during the first communication session such as the first communication session, or not programmed to recognize) to the third-party client requesting the resource. For example, the selected virtual device or other intermediary devices (e.g., network load balancer 104) can act as a proxy such that the first communication session appears (e.g., from the perspective of the third-party client) to be between the third-party client and the resource. As a further example, the third-party client can be unaware of the second communication session and/or unaware that the second communication session is based on a protocol other than the first protocol, such as the second protocol. Therefore, the third-party client and the resource can communicate even if the two are using different messaging protocols.

Optionally, additional information can be received at the first port 302. The additional information can be addressed to the identifier. The additional information can be transmitted from the second port 308 through the dynamically bound communication path. For example, the additional information can be received from the first device or from a third device, such as device managed by a service provider and/or content provider. The additional information can comprise, for example, information related and/or unrelated to the first communication session and/or second communication session. The additional information can comprise billing data, system upgrade data, messaging related to one or more services and/or resources on the same device and/or local area network of the resource, content information (e.g., for display and/or processing by the resource), transaction information, user account information, and/or the like. For example, the additional information can comprise additional content for display via the resource (e.g., video controller) to a user. Additional information can comprise, for instance, entitlement data. In an aspect, additional information can comprise one or more of channel lineups, video conversion mapping data, customer account information, device information, or any information that is not present in the information communicated through the first communication session. In a further aspect, video conversion mapping data can comprise resolution conversion mapping data. In a further aspect, resolution conversion mapping data can comprise data for mapping from one resolution to a higher resolution. In a further aspect, data for mapping from one resolution to a higher resolution can comprise data for mapping from standard definition to high definition. In an aspect, resolution conversion mapping data can comprise data for mapping one resolution to a lower resolution. In a further aspect, data for mapping from one resolution to a lower resolution can comprise data for mapping high definition to standard definition. In an aspect, video conversion mapping data can comprise frame rate mapping data. In a further aspect, frame rate mapping data can comprise data for mapping a frame rate to a higher frame rate. In an aspect, frame rate mapping data can comprise data for mapping a frame rate to a lower frame rate.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
    receiving information, by a virtual machine cluster of a plurality of virtual machine clusters and from a load balancer based at least in part on a port at which the load balancer received the information, via a first communication session that is associated with a first communication protocol,
    converting, by a terminator proxy instance associated with the virtual machine cluster, the information from a first format associated with the first communication protocol to a second format associated with a second communication protocol;
    selecting, by the terminator proxy instance and based on a dynamically reconfigurable routing table for the plurality of virtual machine clusters, a dynamically bound communication path to a resource;
    augmenting, by the terminator proxy instance, the information; and
    sending, by the terminator proxy instance via a second communication session that utilizes the dynamically bound communication path, the augmented information to the resource, wherein the second communication session is associated with the second communication protocol.

2. The method of claim 1, wherein the receiving the information comprises receiving the information from a billing system, and wherein the resource is configured to provide an interface for a user to acquire access to content.

3. The method of claim 1, wherein the selecting comprises selecting the dynamically bound communication path based on one or more message fields comprising at least one of: a franchise tax area, a market ID, a region ID, or an account type.

4. The method of claim 1, wherein the resource comprises a video controller, and wherein the first communication protocol is one of: a Wirelink protocol or business and operating support system (BOSS).

5. The method of claim 1, wherein the augmenting comprises adding additional data that comprises at least one of: channel lineups, video conversion mapping data, or customer account information.

6. The method of claim 1, wherein the receiving comprises receiving the information based on a virtual address associated with the virtual machine cluster of the plurality of virtual machine clusters.

7. The method of claim 1, wherein the virtual machine cluster Comprises a plurality of virtual machines.

8. The method of claim 1, wherein the port at which the information is Received is associated with an identifier that is associated with the resource.

9. The method of claim 1, wherein the load balancer comprises an Outgoing port configured to send the information based on an identifier Associated with the resource.

10. A method, comprising:
    receiving, by a virtual machine cluster, information via a first communication session that is associated with a first communication protocol;
    receiving, by the virtual machine cluster, a reconfigured routing configuration based on a network condition, wherein the reconfigured routing configuration comprises a binding associated with a resource to establish a dynamically bound communication path;
    converting by a terminator proxy instance of the virtual machine cluster, the information from a first format associated with the first communication protocol to a second format associated with a second communication protocol; augmenting, by the terminator proxy instance, the information; and
    sending, by the terminator proxy instance via a second communication session that utilizes the dynamically bound communication path, the augmented information to the resource, wherein the second communication session is associated with the second communication protocol.

11. The method of claim 10, wherein the first communication protocol is one of: a Wirelink protocol or business and operating support system (BOSS).

12. The method of claim 10, wherein the network condition comprises at least one of: a MAC address, a franchise tax area, a market ID, a region ID, or an account type.

13. The method of claim 10, wherein the resource comprises a video controller.

14. The method of claim 10, wherein the terminator proxy instance is configured to augment the information by appending additional data to the information.

15. The method of claim 10, wherein the receiving the information comprises receiving the information from a dedicated port of a router.

16. A method, comprising:
    receiving, by a load balancer via a first port associated with an addressable identifier of a resource, first information and second information, via a first communication session, that is associated with a first communication protocol, wherein the second information comprises an indication of the addressable identifier;
    determining, by the load balancer, a network condition;
    selecting, by the load balancer, a virtual machine cluster based on the network condition;
    dynamically binding, by the load balancer, a second port of the load balancer to the virtual machine cluster, resulting in a dynamically bound communication path; and
    sending, by the load balancer via the second port, the first information and the second information via the dynamically bound communication path to the virtual machine cluster via the first communication session, wherein a terminator proxy instance associated with the virtual machine cluster is configured to:
        convert the first information and the second information from a first format associated with the first communication protocol to a second format associated with a second communication protocol,
        augment the first information with the second information, and send the augmented first information to the resource via a second communication session associated with the second communication protocol.

17. The method of claim 16, wherein the resource comprises a video controller.

18. The method of claim 16, wherein the network Conditions comprises a current load of a network.

19. The method of claim 16, wherein the virtual machine is one of a dynamically managed cluster of virtual machines.

* * * * *